(12) United States Patent
Medlen et al.

(10) Patent No.: US 11,106,281 B2
(45) Date of Patent: Aug. 31, 2021

(54) PROVIDING HAPTIC FEEDBACK ON A SCREEN

(71) Applicant: PayPal, Inc., San Jose, CA (US)

(72) Inventors: Jiri Medlen, Fullerton, CA (US); Braden Christopher Ericson, San Jose, CA (US); Gautam Madaan, San Jose, CA (US); Anush Vishwanath, Santa Clara, CA (US); Michael Charles Todasco, Santa Clara, CA (US); Cheng Tian, San Jose, CA (US); Titus Woo, San Jose, CA (US); Cameron Winter McClees, San Jose, CA (US); David Flemate, San Mateo, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/686,018

(22) Filed: Nov. 15, 2019

(65) Prior Publication Data
US 2020/0159329 A1 May 21, 2020

Related U.S. Application Data

(63) Continuation of application No. 15/711,094, filed on Sep. 21, 2017, now Pat. No. 10,509,473.

(51) Int. Cl.
*G06F 3/01* (2006.01)
*G06F 3/0482* (2013.01)
(Continued)

(52) U.S. Cl.
CPC .............. *G06F 3/016* (2013.01); *G06F 3/041* (2013.01); *G06F 3/0482* (2013.01);
(Continued)

(58) Field of Classification Search
CPC ....... G06F 3/016; G06F 2203/013–015; G06F 3/048–04886; G06Q 20/00–425; G06Q 30/00–08
See application file for complete search history.

(56) References Cited

U.S. PATENT DOCUMENTS 8,009,022 B2 * 8/2011 Kipman ................. G06F 3/011
340/407.1
8,538,827 B1 * 9/2013 Dryer ..................... G06Q 30/00
705/26.1
(Continued)

FOREIGN PATENT DOCUMENTS

EP 2728445 5/2014
EP 2733575 5/2014
(Continued)

OTHER PUBLICATIONS

Ali Israr, Siyan (Susan) Zhao, Kaitlyn Schwalje, Roberta Klatzky and Jill F. Lehman, "Feel Effects: Enriching Storytelling with Haptic Feedback", ACM Symposium on Applied Perception (SAP) 2014, Aug. 8, 2014, ACM Transactions on Applied Perception, vol. 1, No. 1, Article 1, Publication date: Jul. 2014) (https://www.disneyresearch.com/publication/feel-effecls/).
(Continued)

*Primary Examiner* — Patrick F Marinelli
(74) *Attorney, Agent, or Firm* — Haynes and Boone, LLP (57) ABSTRACT

A computer system associates one or more haptic feedbacks with one or more user activities. The computer system monitors current user activity on a computing device to determine whether the current user activity corresponds to at least one of the one or more user activities. In response to determining that the current user activity corresponds to a first user activity of the one or more user activities, the computer system causes a first haptic feedback of the one or
(Continued)

more haptic feedbacks to be provided on the computing device, wherein the first haptic feedback is associated with the first user activity.

19 Claims, 7 Drawing Sheets

(51) Int. Cl.
  *G06F 3/0488* (2013.01)
  *G06F 3/0481* (2013.01)
  *G06F 3/0484* (2013.01)
  *G06F 3/041* (2006.01)
  *H04L 29/08* (2006.01)

(52) U.S. Cl.
  CPC ........ *G06F 3/0488* (2013.01); *G06F 3/04812* (2013.01); *G06F 3/04847* (2013.01); *G06F 3/04883* (2013.01); *G06F 3/04886* (2013.01); *G06F 2203/014* (2013.01); *H04L 67/22* (2013.01)

(56) References Cited

U.S. PATENT DOCUMENTS

| | | | | |
|---|---|---|---|---|
| 9,013,426 | B2* | 4/2015 | Cole | G06F 3/016 345/173 |
| 9,466,188 | B2* | 10/2016 | Hamam | G06F 3/016 |
| 9,600,076 | B2* | 3/2017 | Levesque | G06F 3/016 |
| 9,645,644 | B2* | 5/2017 | Kim | G06F 3/016 |
| 9,733,739 | B1* | 8/2017 | Yates | G06F 3/0412 |
| 9,983,676 | B2* | 5/2018 | Modarres | G06F 3/0416 |
| 9,990,041 | B2* | 6/2018 | Levesque | G06F 3/016 |
| 10,032,346 | B2* | 7/2018 | Heubel | G06F 3/041 |
| 10,168,812 | B1* | 1/2019 | Yates | G06F 3/04883 |
| 10,275,083 | B2* | 4/2019 | Mani | G06F 3/0416 |
| 10,281,983 | B2* | 5/2019 | Mani | G09B 21/003 |
| 10,509,473 | B2* | 12/2019 | Medlen | G06F 3/0482 |
| 10,614,512 | B1* | 4/2020 | Ogborn | G06F 3/04842 |
| 10,614,616 | B1* | 4/2020 | Tedesco | G06F 3/017 |
| 10,809,911 | B2* | 10/2020 | Viswanath | G06F 3/0486 |
| 10,878,302 | B1* | 12/2020 | Vukich | G06K 19/0716 |
| 2004/0021643 | A1* | 2/2004 | Hoshino | G06F 3/016 345/173 |
| 2007/0150842 | A1* | 6/2007 | Chaudhri | G06F 3/04883 715/863 |
| 2009/0219252 | A1* | 9/2009 | Jarventie | G06F 3/04886 345/173 |
| 2010/0302015 | A1* | 12/2010 | Kipman | A63F 13/213 340/407.1 |
| 2011/0055028 | A1* | 3/2011 | Sano | G06Q 20/20 705/16 |
| 2011/0241852 | A1* | 10/2011 | Braun | G06F 3/011 340/407.2 |
| 2011/0248916 | A1* | 10/2011 | Griffin | G06F 3/016 345/157 |
| 2011/0279249 | A1* | 11/2011 | Kipman | G06F 3/016 340/407.1 |
| 2012/0146890 | A1* | 6/2012 | Karstens | G06F 3/016 345/156 |
| 2012/0256848 | A1* | 10/2012 | Madabusi Srinivasan | G06F 3/04883 345/173 |
| 2012/0286944 | A1* | 11/2012 | Forutanpour | G06F 3/016 340/407.1 |
| 2012/0299853 | A1* | 11/2012 | Dagar | G09B 21/003 345/173 |
| 2012/0315607 | A1* | 12/2012 | Shin | G06F 3/0488 434/114 |
| 2013/0102361 | A1* | 4/2013 | Colley | G06F 3/033 455/557 |
| 2013/0156219 | A1* | 6/2013 | Proebstel | G06F 1/1632 381/91 |
| 2013/0181913 | A1* | 7/2013 | Cole | G06F 3/016 345/173 |
| 2014/0033130 | A1* | 1/2014 | Paccagnan | G06F 3/04817 715/835 |
| 2014/0081838 | A1* | 3/2014 | Caiman | G06Q 20/227 705/39 |
| 2014/0145925 | A1* | 5/2014 | Martin | G06F 1/1694 345/156 |
| 2014/0160050 | A1* | 6/2014 | Olien | G06F 3/016 345/173 |
| 2014/0279170 | A1* | 9/2014 | Siddappa | G06Q 30/0611 705/26.4 |
| 2014/0281950 | A1* | 9/2014 | White | G06F 3/04842 715/269 |
| 2014/0281954 | A1* | 9/2014 | Ullrich | G06F 3/04883 715/702 |
| 2014/0333530 | A1* | 11/2014 | Agnetta | G06F 3/0481 345/156 |
| 2014/0340316 | A1* | 11/2014 | Gu | G06F 3/041 345/173 |
| 2014/0380155 | A1* | 12/2014 | Kim | G06F 3/016 715/701 |
| 2015/0054749 | A1* | 2/2015 | Zimchoni | G06F 3/0237 345/172 |
| 2015/0100443 | A1* | 4/2015 | Van Heerden | G06Q 40/025 705/16 |
| 2015/0178712 | A1* | 6/2015 | Angrish | G06Q 20/209 705/5 |
| 2015/0268725 | A1* | 9/2015 | Levesque | G06F 3/016 345/156 |
| 2015/0269555 | A1* | 9/2015 | Clark | G06Q 20/3221 705/39 |
| 2015/0348001 | A1* | 12/2015 | Van Os | H04M 1/72403 705/44 |
| 2015/0365306 | A1* | 12/2015 | Chaudhri | G06F 3/0482 715/736 |
| 2016/0162031 | A1* | 6/2016 | Westerman | G06F 3/0488 345/173 |
| 2016/0170494 | A1* | 6/2016 | Bonnet | G06F 3/0488 345/173 |
| 2016/0179198 | A1* | 6/2016 | Levesque | G06F 1/163 340/407.1 |
| 2016/0189492 | A1* | 6/2016 | Hamam | G06F 3/016 340/407.1 |
| 2016/0306426 | A1* | 10/2016 | Modarres | G06F 3/0416 |
| 2016/0349912 | A1* | 12/2016 | Faubert | G06F 3/016 |
| 2016/0358199 | A1 | 12/2016 | Van Os et al. | |
| 2016/0371691 | A1* | 12/2016 | Kang | G06K 9/00013 |
| 2017/0031444 | A1* | 2/2017 | Heubel | A63F 13/28 |
| 2017/0091753 | A1* | 3/2017 | May | G06Q 20/405 |
| 2017/0116884 | A1* | 4/2017 | Choi | G06F 3/04886 |
| 2017/0123498 | A1* | 5/2017 | Dillon, Jr. | G06F 3/167 |
| 2017/0242488 | A1 | 8/2017 | Levesque et al. | |
| 2017/0255771 | A1* | 9/2017 | Miyakawa | G06F 3/04817 |
| 2017/0269689 | A1* | 9/2017 | Levesque | G06F 1/163 |
| 2017/0300118 | A1* | 10/2017 | Levesque | G08B 6/00 |
| 2018/0095537 | A1* | 4/2018 | Dillon, Jr. | G06F 3/0346 |
| 2018/0182025 | A1* | 6/2018 | Smith | G06Q 30/0623 |
| 2018/0217667 | A1* | 8/2018 | Park | G06F 3/041 |
| 2018/0240363 | A1* | 8/2018 | Vats | G06F 1/1637 |
| 2018/0246574 | A1* | 8/2018 | Modarres | G06F 3/016 |
| 2018/0292966 | A1* | 10/2018 | Shin | G06F 3/04886 |
| 2018/0314333 | A1* | 11/2018 | Levesque | G06F 3/016 |
| 2018/0335847 | A1* | 11/2018 | Levesque | G06F 3/016 |
| 2018/0335928 | A1* | 11/2018 | Van Os | G06Q 20/405 |
| 2018/0336543 | A1* | 11/2018 | Van Os | H04L 67/1078 |
| 2018/0349956 | A1* | 12/2018 | Sharma | G06Q 20/3224 |
| 2019/0087002 | A1* | 3/2019 | Mani | A63F 13/285 |
| 2019/0087003 | A1* | 3/2019 | Medlen | G06F 3/041 |
| 2019/0087049 | A1* | 3/2019 | Mani | G06F 3/017 |
| 2019/0087050 | A1* | 3/2019 | Mani | G06F 3/016 |
| 2019/0121437 | A1* | 4/2019 | Levesque | G08B 6/00 |
| 2019/0204927 | A1* | 7/2019 | Mani | G06F 3/016 |

(56) References Cited

U.S. PATENT DOCUMENTS

2019/0204985 A1* 7/2019 Mani ................. G06F 3/0416
2020/0372514 A1* 11/2020 Van Os .............. G06Q 20/3278

FOREIGN PATENT DOCUMENTS

EP       2733576       5/2014
EP       3109785      12/2016

OTHER PUBLICATIONS

Seung-Chan Kim, Ali Israr and Ivan Poupyrev, "Tactile Rendering of 3D Features on Touch Surfaces", ACM Symposium on User Interface Software and Technology (ACM UIST) 2013, Oct. 8, 2013 [https://www.disneyresearch.com/publication/tactile-rendering-of-3d-features-on-touch-surfaces/).
Extended European Search Report dated Jun. 1, 2021, European Application No. 18858840.4, 8 pages.

* cited by examiner

PROVIDING HAPTIC FEEDBACK ON A SCREEN

CROSS REFERENCE TO RELATED APPLICATION

The present application is a continuation of U.S. patent application Ser. No. 15/711,094, filed Sep. 21, 2017, which is incorporated by reference in its entirety.

TECHNICAL FIELD

The present disclosure relates generally to providing haptic feedback, and more particularly to providing haptic feedback on an electronic screen.

BACKGROUND

In today's age, users have an ever-increasing number of applications on their computing devices and mobile devices. With the large number of applications present on a computing device or mobile device, companies have an increasing desire to have their application stand out. Some methods in which companies try to stand out is through the creation of an interesting or unique logo, or a catchy name. However, with the increasing sophistication of computing devices and mobile devices, it may be beneficial for companies to identify additional technological ways in which they can distinguish their applications from the masses.

DETAILED DESCRIPTION

Embodiments of the present disclosure provide a system, method, and program product. A computer system associates one or more haptic feedbacks with one or more user activities. The computer system monitors current user activity on a computing device to determine whether the current user activity corresponds to at least one of the one or more user activities. In response to determining that the current user activity corresponds to a first user activity of the one or more user activities, the computer system causes a first haptic feedback of the one or more haptic feedbacks to be provided on the computing device, wherein the first haptic feedback is associated with the first user activity.

In the example embodiment, the present disclosure describes a solution to the problem of providing an option for a company to associate a haptic feedback with an application. This solution allows an application on a user device to have an additional level of expression that goes beyond just a visual look of an application on a user display. In the example embodiment, the present disclosure describes a solution that includes identifying a haptic feedback that is associated with the application. The present disclosure further describes monitoring user activity and determining whether the user activity is within a threshold distance of the application on the display of the computing device. In response to determining that the monitored user activity is within the threshold distance of the application on the display of the computing device, the present disclosure further describes providing the identified haptic feedback to the user.

In the example embodiment, the present disclosure describes a solution that associates one or more haptic feedbacks with specific user activities. This solution may be utilized to provide haptic feedback, such as resistance, that helps a user avoid making a purchase that is not in his/her best interest, to guide a user to a certain payment option, or to personalize certain functions based on information associated with the user. In the example embodiment, the present disclosure describes a solution that includes monitoring user activity and determining whether the monitored user activity corresponds to one or more haptic feedbacks. In response to determining that the monitored user activity does not correspond to one or more haptic feedbacks, the present disclosure describes a solution that continues monitoring user activity. In response to determining that the monitored user activity corresponds to one or more haptic feedbacks, the present disclosure describes a solution that provides the determined one or more haptic feedbacks to the user.

Embodiments of the present disclosure will now be described in detail with reference to the accompanying Figures.

Figure 1:
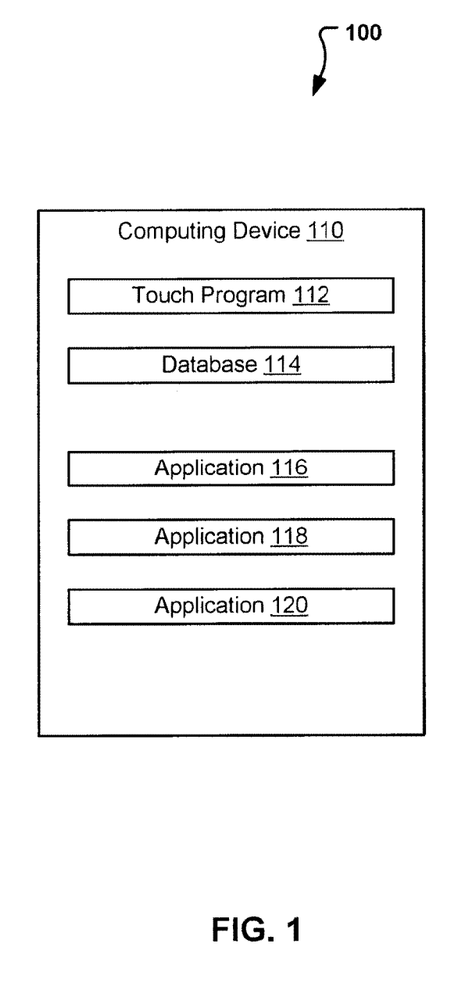
FIG. 1 illustrates a haptic feedback system, in accordance with an embodiment.

FIG. 1 illustrates haptic feedback system 100, in accordance with an embodiment. In the example embodiment, haptic feedback system 100 includes computing device 110, which may connect to other computing devices via a network.

In the example embodiment, computing device 110 includes touch program 112, database 114, application 116, application 118, and application 120.

In the example embodiment, application 116, application 118, and application 120 are each an application such as a social media application, a financial application, a web browser, or another type of application. In the example embodiment, application 116, application 118, and application 120 are each different types of applications, however, in other embodiments, they may have be related applications.

Database 114 includes electronic content/information that details one or more haptic feedbacks that are associated with one or more corresponding applications. In addition, in the example embodiment, database 114 may include one or more haptic feedbacks that are associated with one or more user activities. In addition, in the example embodiment, database 114 may include may include user information of the user of computing device 110, including usage information corresponding to each of application 116, application 118, and application 120. Database 114 is described in further detail with regard to FIGS. 2 and 3.

In the example embodiment, touch program 112 is a program capable of identifying one or more haptic feedbacks that are associated with an application or multiple applications located on computing device 110. In one or more embodiments, touch program 112 may be capable of associating one or more haptic feedbacks with an application or multiple applications located on computing device 110. Furthermore, touch program 112 is capable of monitoring user activity on computing device 110 and determining whether the user activity is within a threshold distance of an application that is associated with one or more haptic feedbacks. Touch program 112 is further capable of providing the associated one or more haptic feedbacks to the user of computing device 110 responsive to determining that the user activity is within the threshold distance of an application associated with one or more haptic feedbacks.

Furthermore, touch program 112 is capable of identifying one or more haptic feedbacks that are associated with a user activity. In one or more embodiments, touch program 112 may be capable of associating one or more haptic feedbacks with a user activity. In addition, touch program 112 is capable of monitoring user activity and determining whether a monitored user activity corresponds to one or more haptic feedbacks. Touch program 112 is further capable of providing the associated one or more haptic feedbacks to the user of computing device 110 responsive to determining that the monitored user activity corresponds to one or more haptic feedbacks.

Figure 2:
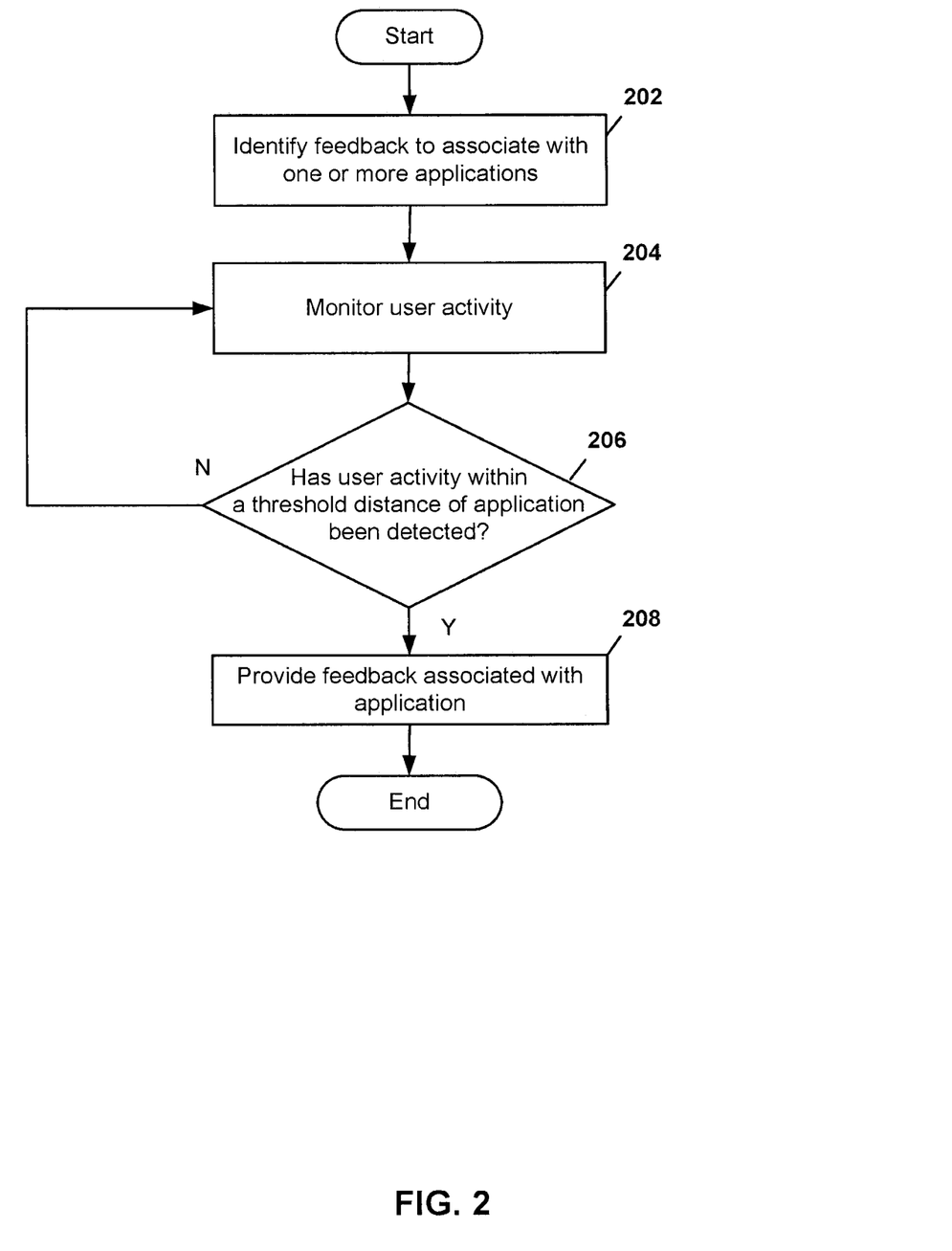
FIG. 2 is a flowchart illustrating the operations of the touch program of FIG. 1 in identifying haptic feedback associated with one or more applications, and providing the appropriate haptic feedback based on engagement with the one or more applications, in accordance with an embodiment.

FIG. 2 is a flowchart illustrating the operations of touch program 112 in identifying haptic feedback associated with one or more applications, and providing the appropriate haptic feedback based on engagement with the one or more applications, in accordance with an embodiment.

In the example embodiment, touch program 112 identifies haptic feedback to associate with each of one or more applications (step 202). In the example embodiment, touch program 112 may receive input from the user of computing device 110 detailing haptic feedback to associate with each of the one or more applications (application 116, application 118, and application 120). In other embodiments, touch program 112 may communicate with application servers corresponding to each of the one or more applications and determine a haptic feedback to associate with each respective application based on information provided by the corresponding application server. For example, touch program 112 may receive information from an application server associated with application 116 that may communicate that a vibration feedback simulating a heartbeat should be associated with application 116. Touch program 112 may then associate the vibration feedback with application 116 in database 114.

Touch program 112 may monitor user activity of the user of computing device 110 (step 204). In the example embodiment, monitoring user activity may include touch program 112 communicating with the operating system of computing device 110 to identify the portion of the displayed content that the user of computing device 110 is interacting with.

In the example embodiment, touch program 112 may determine whether the current user activity of the user of computing device 110 includes an activity that is within a threshold distance of an application associated with a haptic feedback (decision 206). In the example embodiment, the "current user activity" of the user of computing device 110 may include user activity that is currently taking place, or has taken place within a threshold time period of the current time. For example, "current user activity" may include user activity that has taken place in the past 2 seconds. Furthermore, in the example embodiment, determining that the current user activity includes an activity within the threshold distance of an application that is associated with the haptic feedback may include determining that the user of computing device 110 is hovering (for example by utilizing a cursor) over the portion of the displayed content corresponding to the application (application icon), determining that the user is using his/her finger to interact with the application icon, determining that the user is utilizing a cursor or pointer to navigate within a threshold distance of the application icon, and/or the like. For example, based on communication with the operating system of computing device 110, touch program 112 may determine that the user of computing device 110 is interacting with a portion of the content displayed on computing device 110 that corresponds to application 116 (which corresponds to a first type of haptic feedback) by way of determining that the user of computing device 110 has utilized his/her finger to make contact with a portion of the display screen that corresponds to the application icon.

In the example embodiment, touch program 112 may continuously identify whether a monitored current user activity corresponds to a haptic feedback by cross-referencing the monitored user activity against database 114, which in the example embodiment, includes information describing one or more applications and one or more corresponding haptic feedbacks. In other embodiments, touch program 112 may, first identify the applications that are associated with one or more corresponding haptic feedbacks, and then monitor user activity to determine if a monitored current user activity occurs within a threshold distance of an identified application. Furthermore, in the example embodiment, each application has the same associated threshold distance, while in other embodiments, each or some of the applications may have a different associated threshold distance, which may additionally be stored in database 114 in association with the corresponding application.

If touch program 112 determines that the current user activity of computing device 110 does not include an activity that is within the threshold distance of an application associated with a haptic feedback (decision 206, "NO" branch), touch program 112 continues to monitor user activity on computing device 110 as described above.

If touch program 112 determines that the current user activity of computing device 110 includes an activity that is within the threshold distance of an application that is associated with a haptic feedback (decision 206, "YES" branch), touch program 112 provides the haptic feedback associated with the relevant application (step 208). In the example embodiment, touch program 112 provides the haptic feedback associated with the relevant application by utilizing electro-static/electro-vibration techniques to increase or decrease a physical resistance on a portion of the display screen, or to provide another type of haptic sensation as described below. In the example embodiment, touch program 112 may alter utilize electro-static techniques to alter the friction encountered as a user's finger glides across the display screen of computing device 110 which can be utilized to increase or decrease a physical resistance felt by the user of computing device 110.

In one example, an application, such as application 116 may be associated with a haptic feedback that simulates a heart-beat. Touch program 112 may provide the haptic feedback utilizing, for example, a micro-vibration motor, to provide a beating haptic sensation upon detection by touch program 112 that the user of computing device 110 has made contact with a portion of the display screen of computing device 110 that corresponds to an application icon of application 116. In another example, touch program 112 may utilize electro-static techniques to provide friction point (or points) and then subsequently remove the friction points (or points) at a high enough speed that it simulates a heart-beat. In a further example, touch program 112 may utilize electro-static techniques in conjunction with providing (and removing friction points) in order to simulate a heart-beat (or simulate another sensation). In this example, the beating haptic sensation would be provided to the user of computing device 110 in the portion of the display screen of computing device 110 that corresponds to the application icon of application 116, while in other embodiments, the beating haptic sensation may be provided in a different location within the display screen or throughout the entire computing device. In a further embodiment, touch program 112 may identify a heart rate of the user of computing device 110 utilizing one or more sensors, and further utilize the techniques described above to provide a haptic sensation that mimics the heart-beat of the user of computing device 110.

In another example, an application, such as application 118 may be associated with a haptic feedback that corresponds to a temperature change. Touch program 112 may provide the haptic feedback by, for example, overclocking certain components of computing device 110 so that a certain portion of the display screen is warmer than other portions, providing a warm temperature sensation upon detection by touch program 112 that the user of computing device 110 has made contact with the portion of the display screen of computing device 110 that corresponds to an application icon of application 118. In this example, the warm temperature haptic sensation would be provided to the user of computing device 110 in the portion of the display screen of computing device 110 that corresponds to the application icon of application 118, however, in other embodiments, the warm temperature haptic sensation may be provided in a different location within the display screen or throughout the entire computing device. In this example, each of application 116, application 118, and application 120 may have a different temperature associated with it, and therefore, may provide another level of uniqueness to the application icon.

In a further example, an application, such as application 120 may be associated with a haptic feedback that corresponds to a brail sensation, where information, such as the application name may be provided to the user of computing device 110 in brail. Touch program 112 may provide the haptic feedback utilizing, in the example embodiment, electro-static techniques to alter the friction encountered across the display screen in a manner so as to simulate friction forces perceived by a human finger when it slides over a real bump. A person perceives a bump (a real bump) largely because lateral friction forces stretch and compress skin on the sliding finger. Therefore, based on this principle, touch program 112 may utilize electro-static techniques as described above to create friction points on the display screen that may be used to provide friction in a manner that simulates the friction that would be felt by a finger of a user that is encountering an actual bump (or bumps) corresponding to a brail word or phrase. In one example, in creating a friction point(s) touch program 112 may calculate the gradient of the virtual surface desired to be rendered (i.e.—surface with a brail bump), determine the dot product of the gradient of the virtual surface and velocity of the sliding finger, and map the dot-product to the voltage using a determined psychophysical relationship between the voltage applied to the display and the subjective strength of friction forces. In other embodiments, touch program 112 may utilize other methods as would be known to one skilled in the art.

Touch program 112 may implement the techniques described upon detection by touch program 112 that the user of computing device 110 has made contact with a portion of the display screen of computing device 110 that corresponds to an application icon of application 118. In this example, the friction points would be provided to the user of computing device 110 in the portion of the display screen of computing device 110 that corresponds to the application icon of application 118, however, in other embodiments, the friction points (used to simulate brail bumps) may be provided in a different location within the display screen or throughout the entire display screen. Furthermore, in further embodiments, the friction points may be provided to the user of computing device 110 in response to a "brail option" being toggled on computing device 110. While in the example embodiment, touch program 112 utilizes the friction points to simulate brail bumps on the display screen of computing device 110, in other embodiments, touch program 112 may utilize friction points to simulate other types of bumps on the display screen of computing device 110.

The examples above are not an exhaustive list of haptic sensations that may be provided by utilizing the techniques or the combination of techniques described above, and in one or more embodiments, other haptic sensations known by a person skilled in the art may be provided by touch program 112 to the user of computing device 110.

Figure 3:
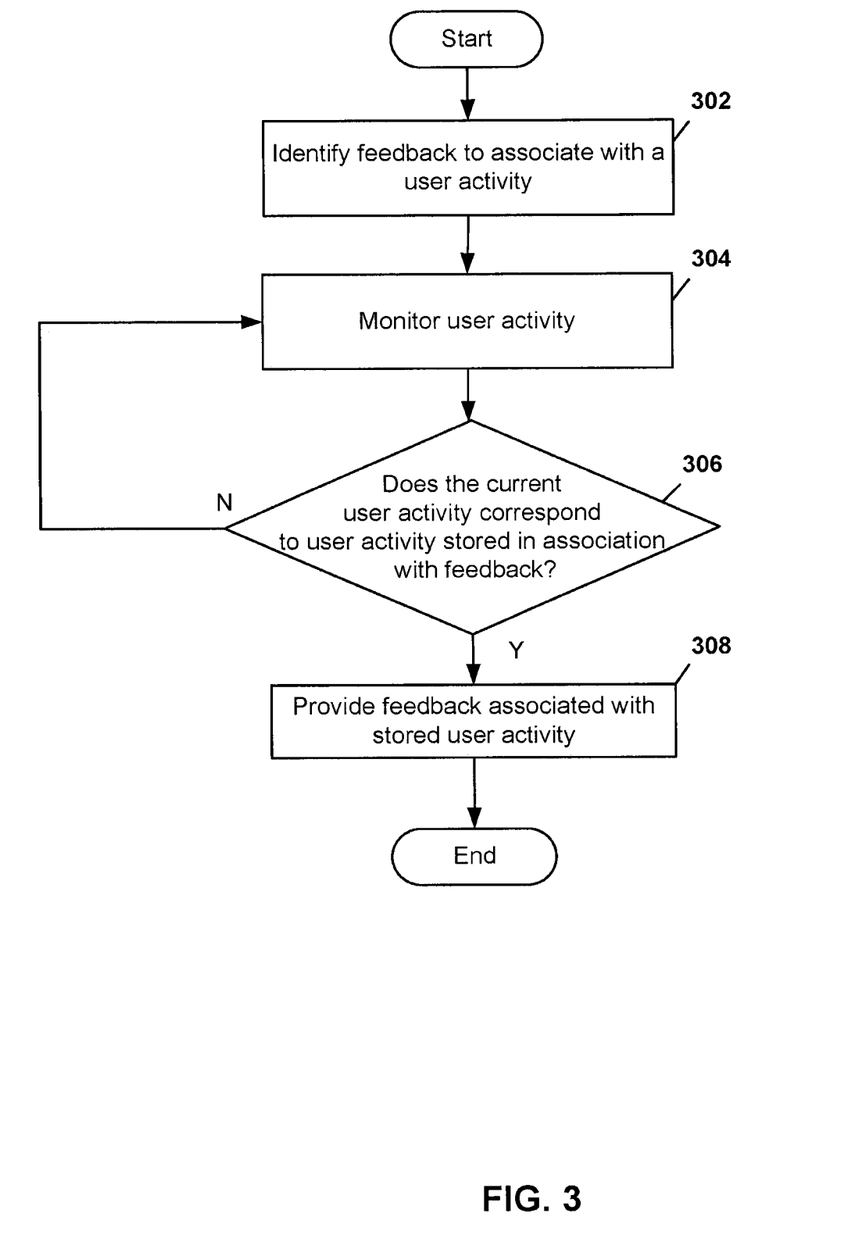
FIG. 3 is a flowchart illustrating the operations of the touch program of FIG. 1 in identifying haptic feedback associated with a user activity, and providing the appropriate haptic feedback based on identifying the user activity, in accordance with an embodiment.

FIG. 3 is a flowchart illustrating the operations of the touch program 112 in identifying haptic feedback associated with a user activity, and providing the appropriate haptic feedback based on identifying the user activity, in accordance with an embodiment.

In the example embodiment, touch program 112 identifies haptic feedback to associate with each of one or more user activities (step 302). In the example embodiment, touch program 112 may receive input from the user of computing device 110 detailing haptic feedback to associate with each of the one or more user activities. In other embodiments, touch program 112 may determine a haptic feedback to associate with a user activity based on a pre-defined set of rules. For example, if based on analyzing financial information associated the user of computing device 110 (such as by communicating with financial application servers), touch program 112 determines that the user of computing device 110 frequently has a bank account balance in a primary bank account that is below a threshold level, touch program 112 may associate a resistance feedback with any user activity associated with purchases above a certain amount of money, or alternatively purchases of a certain type. For example, the purchases of a certain type may include purchases made a certain times of the day (such as in the middle of the night), purchases of certain items, purchases from certain stores/merchants, and/or the like. In one example, if touch program 112 determines (by communicating with a bank server, or an application server) that a specific purchase will result in insufficient funds in a bank account (such as resulting in an overdrawn account) being used to perform the transaction, touch program 112 may associate (in for example, database 114) a haptic feedback of additional swiping resistance (by way of additional resistance as described above) to the user activity of swiping on the display screen for a purchase authentication. Similarly, if touch program 112 determines that a credit card limit has been reached, touch program 112 may associate a haptic feedback of additional swiping resistance to the user activity of swiping on the display screen for a purchase authentication. In the example embodiment, touch program 112 determines the portion of the display screen that corresponds to the purchase authentication icon or interface element and adds the additional swiping resistance, for example, via electro-static means, to the corresponding portion of the display screen of computing device 110.

In another example, touch program 112 may determine that a first payment option is a preferred payment option (through user input or based on monitoring user payment habits), and based on determining that the first payment option is a preferred payment option, touch program 112 may associate a haptic feedback of additional swiping resistance to the user activity of swiping on a portion of the display screen that corresponds to an interface element that represents a selection or authentication of a payment option other than the first payment option. Furthermore, touch program 112 may reduce swiping resistance (utilizing electro-static techniques to reduce friction as described above) for the user activity of swiping on a portion of the display screen that corresponds to an interface element that represents a selection or authentication of the first payment option (preferred payment option).

In further embodiments, touch program 112 may communicate with application servers corresponding to one or more applications (such as application 116, 118, and 120), and determine a haptic feedback to associate with one or more user activities within each respective application based on information provided by the application servers. For example, touch program 112 may receive information from an application server associated with application 116 that may communicate that a haptic feedback of additional swiping resistance should be associated with the user activity corresponds to swiping on a portion of the display screen (of computing device 110) corresponding to an interface element that represents a selection or authentication of a payment within application 116, due to application 116 determining that the credit of the user of computing device 110 is too low, or due to an outstanding balance within application 116 being above a certain limit. Touch program 112 may then associate, in database 114, the swiping resistance feedback with the specific user activity of performing a purchase within application 116. Furthermore, in an alternate embodiment, touch program 112 may determine to associate the swiping resistance feedback with the specific activity of performing a purchase within application 116, for example, based on touch program 112 determining that an outstanding balance with application 116 is above a certain limit.

Touch program 112 may monitor user activity of the user of computing device 110 (step 304). In the example embodiment, monitoring user activity may include touch program 112 communicating with the operating system of computing device 110 to identify the portion of the displayed content that the user of computing device 110 is interacting with.

In the example embodiment, touch program 112 may determine whether the current user activity of the user of computing device 110 includes an activity that is associated with a haptic feedback (decision 306). In the example embodiment, as stated above, the "current user activity" of the user of computing device 110 may include user activity that is currently taking place, or has taken place within a threshold time period of the current time. For example, "current user activity" may include user activity that has taken place in the past 2 seconds.

Furthermore, in an example, if touch program 112 associates the user activity of swiping on a portion of the display screen that corresponds to an interface element for a purchase authentication with a haptic feedback of additional swiping resistance, touch program 112 may monitor for user activity that may include determining that the user of computing device 110 is hovering (for example by utilizing a cursor) over the portion of the displayed content corresponding to the interface element, determining that the user is using his/her finger to interact with the interface element, determining that the user is utilizing a cursor or pointer to navigate within a threshold distance of the interface element, and the like. Referring to the example, based on communication with the operating system of computing device 110, if touch program 112 determines that the user of computing device 110 is utilizing his/her finger to interact with (or swipe) a portion of the display screen on computing device 110 that corresponds to the interface element for a purchase element, touch program 112 may determine that the monitored user activity corresponds to a user activity associated with a haptic feedback.

In the example embodiment, touch program 112 may continuously identify whether a monitored current user activity corresponds to a haptic feedback by cross-referencing the monitored user activity against database 114, which in the example embodiment, includes information describing one or more user activities and one or more corresponding haptic feedbacks. In other embodiments, touch program 112 may, first identify the one or more user activities that are associated with one or more corresponding haptic feedbacks, and then monitor user activity to determine if a monitored current user activity occurs that includes at least one of the one or more user activities.

If touch program 112 determines that the current user activity of computing device 110 does not include an activity that is associated with a haptic feedback (decision 306, "NO" branch), touch program 112 continues to monitor user activity on computing device 110 as described above.

If touch program 112 determines that the current user activity of computing device 110 includes an activity that is associated with a haptic feedback (decision 306, "YES" branch), touch program 112 provides the haptic feedback associated with the user activity (step 308). In the example embodiment, touch program 112 provides the haptic feedback associated with the relevant application by utilizing electro-static techniques to increase or decrease a physical resistance on a portion of the display screen, or to provide another type of haptic sensation as described above, and additionally further described below.

For example, referring to the example above, where touch program 112 associates the user activity of swiping on a portion of the display screen that corresponds to an interface element for a purchase authentication with a haptic feedback of additional swiping resistance, if touch program 112 determines that the user of computing device 110 is utilizing his/her finger to interact with (or swipe) a portion of the display screen on computing device 110 that corresponds to the interface element for a purchase element, touch program 112 may determine that the monitored user activity corresponds to a user activity associated with a haptic feedback, and further provide the associated haptic feedback to the user (i.e. additional swiping resistance which may make it more difficult for the user to make a purchase).

In another example, touch program 112 may associate the user activity of hovering or navigating within a threshold distance of a non-preferred payment option presented on a display screen of computing device 110 with additional navigational resistance. Therefore, in this example, if touch program 112 determines that the current user activity on computing device 110 includes the user, for example utilizing a pointer to navigate towards the non-preferred payment option, touch program 112 may provide the haptic feedback of additional resistance to a portion of the display screen that corresponds to an interface element of the non-preferred payment option and/or an area around the interface element. The additional resistance may make it more difficult for the user of computing device 110 to navigate to the non-preferred payment option. Furthermore, touch program 112 may provide additional resistance around the pointer to help guide the user to an area of the display screen that corresponds to an interface element of the preferred payment option. For example, the user may be met with resistance when trying to navigate in all other directions that do not lead to the interface element of the preferred payment option. Additionally, in this example, the resistance may be provided only upon detection by touch program 112 that all required information corresponding to the displayed content has been filled out. In other words, for the example of a checkout page, an address and a name may be required in addition to a selection of a payment option. In this example, touch program 112 may provide the additional resistance upon determination that the address and name information has been completed by the user.

In a further example, touch program 112 may identify areas of interest corresponding to the user of computing device 110, for example, by referencing social media information, personal information, and the like. Touch program 112 may then associate a user activity within a threshold distance of an area of interest, such as content of interest or a topic of interest, with a haptic feedback, which provides resistance to lead the user to the area of interest. Furthermore, if touch program 112 determines that a current user activity is within a threshold distance to an area of interest, such as a displayed content corresponding to a topic of interest to the user, touch program 112 may provide resistance to certain portions of the display of computing device 110 so that the user (or a cursor of the user) is led to the area of interest.

In another example, touch program 112 may additionally be capable of detecting a view direction of a user with regard to computing device 110, and further may be capable of analyzing an eye movement pattern of the user of computing device 110 to determine whether the user is currently reading a specific portion of the displayed content on computing device 110. Therefore, in this example, touch program 112 may add additional resistance to a scrolling feature of computing device 110, if touch program 112 determines that the user of computing device 110 is reading or viewing a specific portion of content that may be out of display if the user scrolls down. In other words, in one example, the user of computing device 110 may accidentally scroll down a page (for example by utilizing his/her finger, or a cursor) which may cause a portion of view content be moved out of display. The present solution described may add additional resistance to prevent the user of computing device 110 from accidentally scrolling away from content being viewed, based on touch program 112 determining that a specific portion of the displayed content is being viewed. Furthermore, based on determining that the specific portion of content is being viewed by the user of computing device 110, touch program 112 may calculate an amount of scrolling that may be allowed, for example, touch program 112 may allow an amount of scrolling that would not push the specific portion of content being viewed off the display. Beyond the determined amount, touch program 112 may provide additional resistance to prevent accidental scrolling past the allowed amount.

In another example, touch program 112 may additionally provide additional resistance in response to determining that an authentication of the user of computing device 110 is being performed. For example, if one or more fingerprint sensors are present on a display screen of computing device 110, touch program 112 may provide additional resistance to help guide the user of computing device 110 to the areas of the display screen that contain the fingerprint sensors. Furthermore, the area of the display screen that contains the fingerprint sensors may additionally be represented as a friction point(s) that simulate a bump or bumps by way of touch program 112 utilizing electro-static techniques as described above.

In another example, touch program 112 may utilize electro-static techniques to provide a different level of resistance or friction points to different interface elements. For example, an "Okay" Button or "Next" Button in a user interface may be associated with a specific type of feel, while a "Checkout" Button may be associated with a different type of feel. Therefore, touch program 112 may utilize electro-static techniques to create a friction point(s) that simulates a bump with a first type of feel for an interface element corresponding to an "Okay" Button, and may further create a friction point(s) that simulate a bump with a second type of feel for an interface element corresponding to a "Checkout" Button. Furthermore, touch program 112 may utilize the techniques described so that an interface element corresponding to a preferred payment option has a different feel than an interface element corresponding to a non-preferred payment option. Furthermore, touch program 112 may utilize electro-static techniques to lessen the resistance experienced by the user of computing device 110 when swiping an interface element that corresponds to a preferred payment option when compared to an amount of resistance experienced by the user of computing device 110 when swiping interface elements corresponding to non-preferred payment options.

Furthermore, touch program 112 may additionally provide additional resistance in response to determining that an authentication such as a CAPTCHA® (Captcha is a trademark of Carnegie Mellon University) type of authentication is being performed. For example, rather than providing Captcha authentication that must be entered by the user, touch program 112 may prompt the user of computing device 110 to locate and press a certain portion (or portions) of the display screen of computing device 110. Touch program 112 may provide additional resistance to help guide the user of computing device 110 to the certain portion of the display screen, and further may represent the certain portion as a friction point(s) that simulate a bump or bumps as described above.

Figure 4:
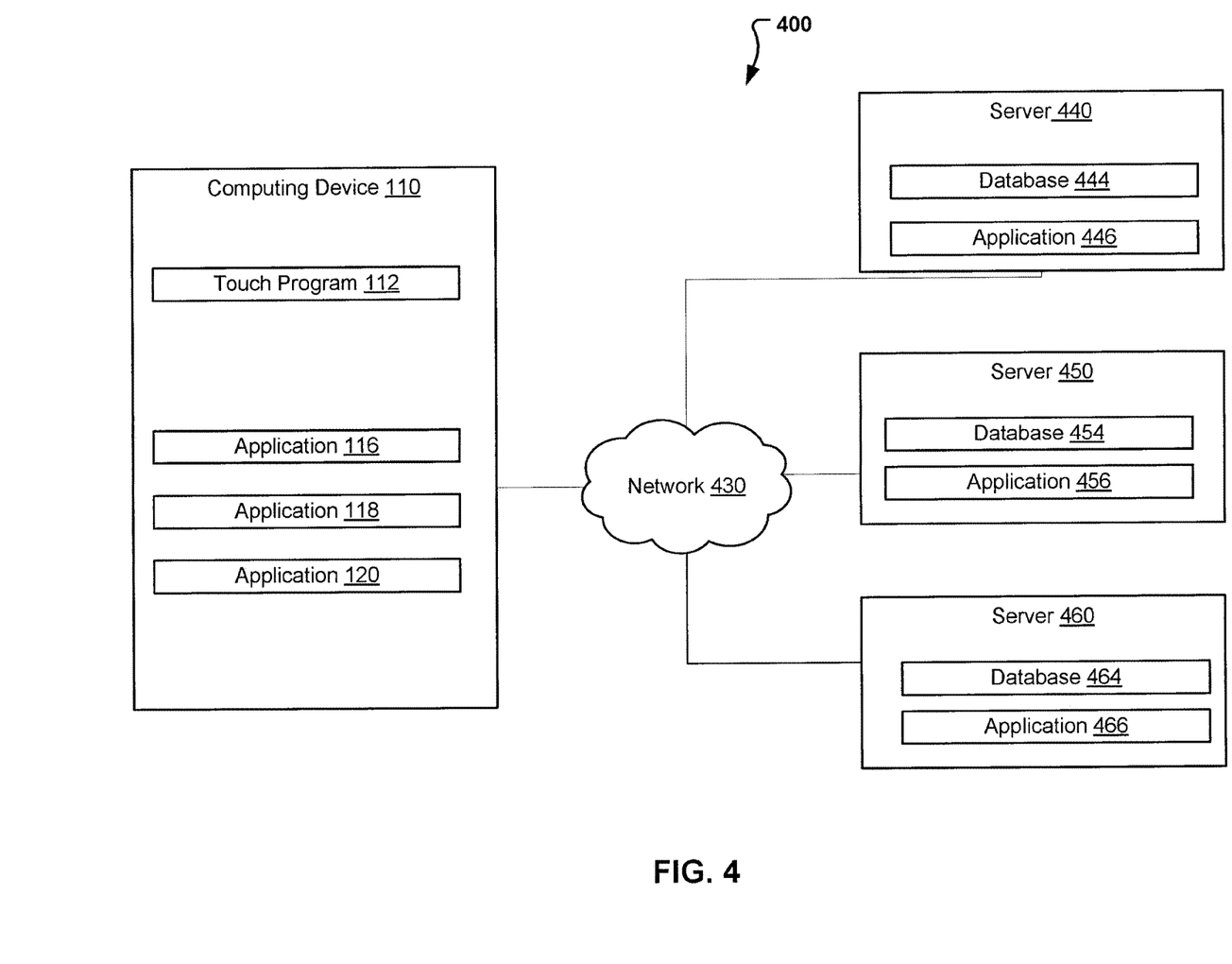
FIG. 4 illustrates an alternate embodiment of the haptic feedback system of FIG. 1, in accordance with an embodiment.

FIG. 4 illustrates an alternate embodiment of a haptic feedback system, haptic feedback system 400, in accordance with an embodiment. In the example embodiment, haptic feedback system 400 includes computing device 110, server 440, server 450, and server 460 all interconnected via network 430.

In the example embodiment, network 430 is the Internet, representing a worldwide collection of networks and gateways to support communications between devices connected to the Internet. Network 430 may include, for example, wired, wireless or fiber optic connections. In other embodiments, network 430 may be implemented as an intranet, a local area network (LAN), or a wide area network (WAN). In general, network 430 can be any combination of connections and protocols that will support communications between computing device 110, server 440, server 450, and server 460.

Server 440 includes application 446 and database 444. In the example embodiment, server 440 may be a desktop computer, a laptop computer, a tablet computer, a mobile device, a handheld device, a thin client, or any other electronic device or computing system capable of receiving and sending data to and from other computing devices, such as computing device 110, via network 430. Although not shown, optionally, server 440 can comprise a cluster of servers executing the same software to collectively process requests as distributed by a front-end server and a load balancer. In the example embodiment, server 440 is a server that supports application 446, which is a server side application of application 116 (client application). Server 440 is described in more detail with reference to FIG. 7.

In the example embodiment, database 444 may include electronic content/information that details one or more haptic feedbacks that are associated with the user of computing device 110 with regard to application 116. For example, database 444 may include information that includes a haptic feedback that is associated with application 116, and furthermore, may include one or more haptic feedbacks associated with one or more other client side applications of application 446. In addition, in the example embodiment, database 444 may include user information, including usage information, corresponding to one or more client side applications of application 446, such as user information corresponding to application 116.

Server 450 includes application 456 and database 454. In the example embodiment, server 450 may be a desktop computer, a laptop computer, a tablet computer, a mobile device, a handheld device, a thin client, or any other electronic device or computing system capable of receiving and sending data to and from other computing devices, such as computing device 110, via network 430. Although not shown, optionally, server 450 can comprise a cluster of servers executing the same software to collectively process requests as distributed by a front-end server and a load balancer. In the example embodiment, server 450 is a server that supports application 456, which is a server side application of application 118 (client application). Server 450 is described in more detail with reference to FIG. 7.

In the example embodiment, database 454 may include electronic content/information that details one or more haptic feedbacks that are associated with the user of computing device 110 with regard to application 118. For example, database 454 may include information that includes a haptic feedback that is associated with application 118, and furthermore, may include one or more haptic feedbacks associated with one or more other client side applications of application 456. In addition, in the example embodiment, database 454 may include user information, including usage information, corresponding to one or more client side applications of application 456, such as user information corresponding to application 118.

Server 460 includes application 466 and database 464. In the example embodiment, server 460 may be a desktop computer, a laptop computer, a tablet computer, a mobile device, a handheld device, a thin client, or any other electronic device or computing system capable of receiving and sending data to and from other computing devices, such as computing device 110, via network 430. Although not shown, optionally, server 460 can comprise a cluster of servers executing the same software to collectively process requests as distributed by a front-end server and a load balancer. In the example embodiment, server 460 is a server that supports application 466, which is a server side application of application 120 (client application). Server 460 is described in more detail with reference to FIG. 7.

In the example embodiment, database 464 may include electronic content/information that details one or more haptic feedbacks that are associated with the user of computing device 110 with regard to application 120. For example, database 464 may include information that includes a haptic feedback that is associated with application 120, and furthermore, may include one or more haptic feedbacks associated with one or more other client side applications of application 466. In addition, in the example embodiment, database 464 may include may include user information, including usage information, corresponding to one or more client side applications of application 466, such as user information corresponding to application 120.

In this alternate embodiment (haptic feedback system 400), touch program 112 may communicate with server 440, server 450, and server 460 in order to determine the one or more haptic feedbacks to provide the user of computing device 110, based on a detected current user activity within a threshold distance of an application associated with a haptic feedback, or based on detection of a current user activity that is associated with a haptic feedback.

In other embodiments, application 446 may utilize touch program to monitor current user activity on computing device 110 in relation to application 116. Based on a detecting that the current user activity on computing device 110 is within a specific threshold distance of application 116 and/or based on detecting that the current user activity on computing device 110, for example within application 116, corresponds to one or more haptic feedbacks, application 446 may transmit a signal to touch program 112 to provide an appropriate haptic feedback to the user of computing device, in the same manner as described above. Furthermore, application 456 and application 466 may perform similar functions to provide the user of computing device 110 one or more haptic feedbacks.

Figure 5:
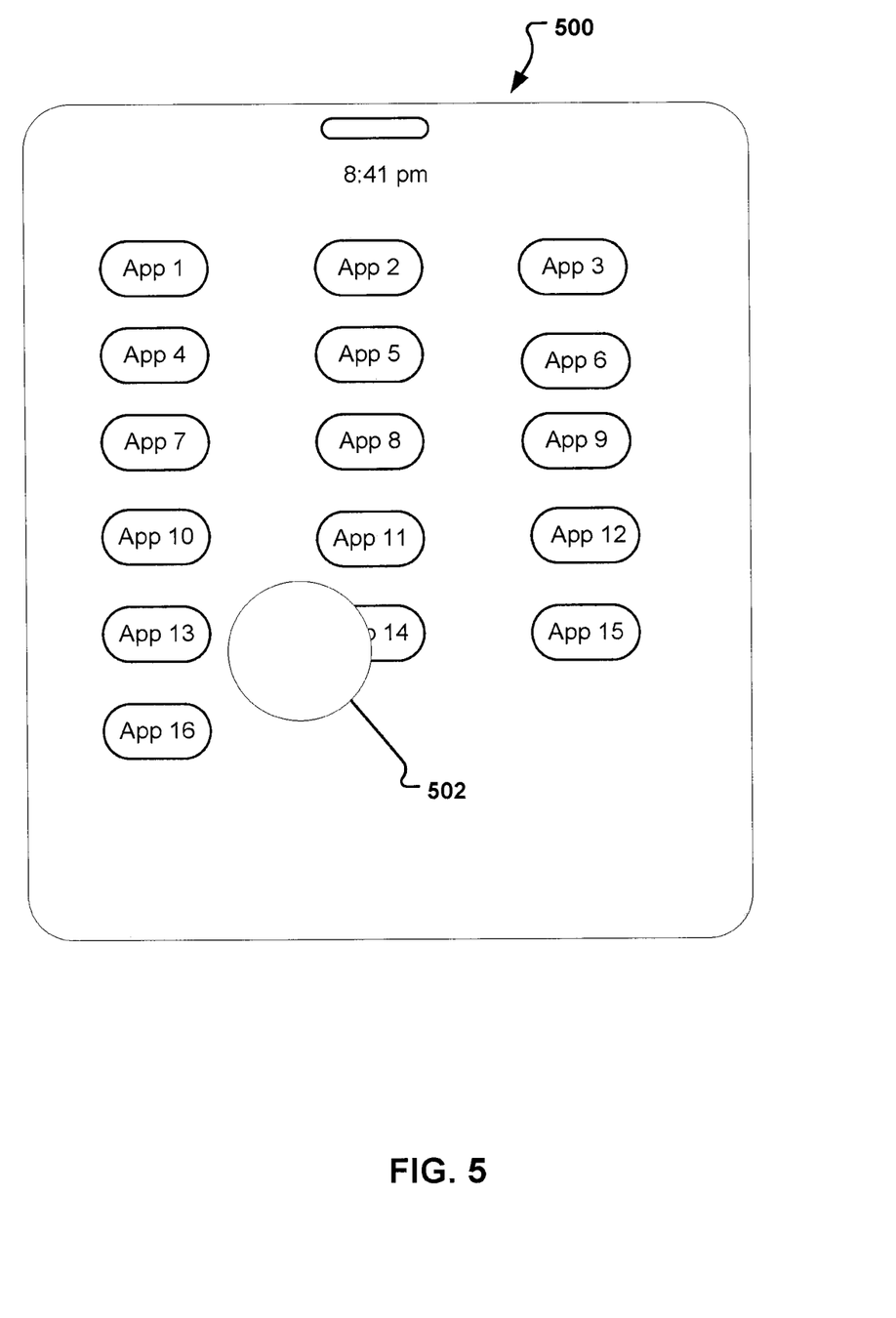
FIG. 5 is an illustration of haptic feedback associated with an application being provided based on detected engagement with the application, in accordance with an embodiment.

FIG. 5 is an illustration of device 500 and further depicts a haptic feedback associated with an application being provided based on detected engagement with the application, in accordance with an embodiment. In the example embodiment, navigation point 502 is an illustration of a finger of a user, a cursor, or a stylus being utilized to engage with a specific interface element corresponding to an application. Furthermore, in the example embodiment, the application is associated with a haptic feedback, which is then provided to the user.

Figure 6:
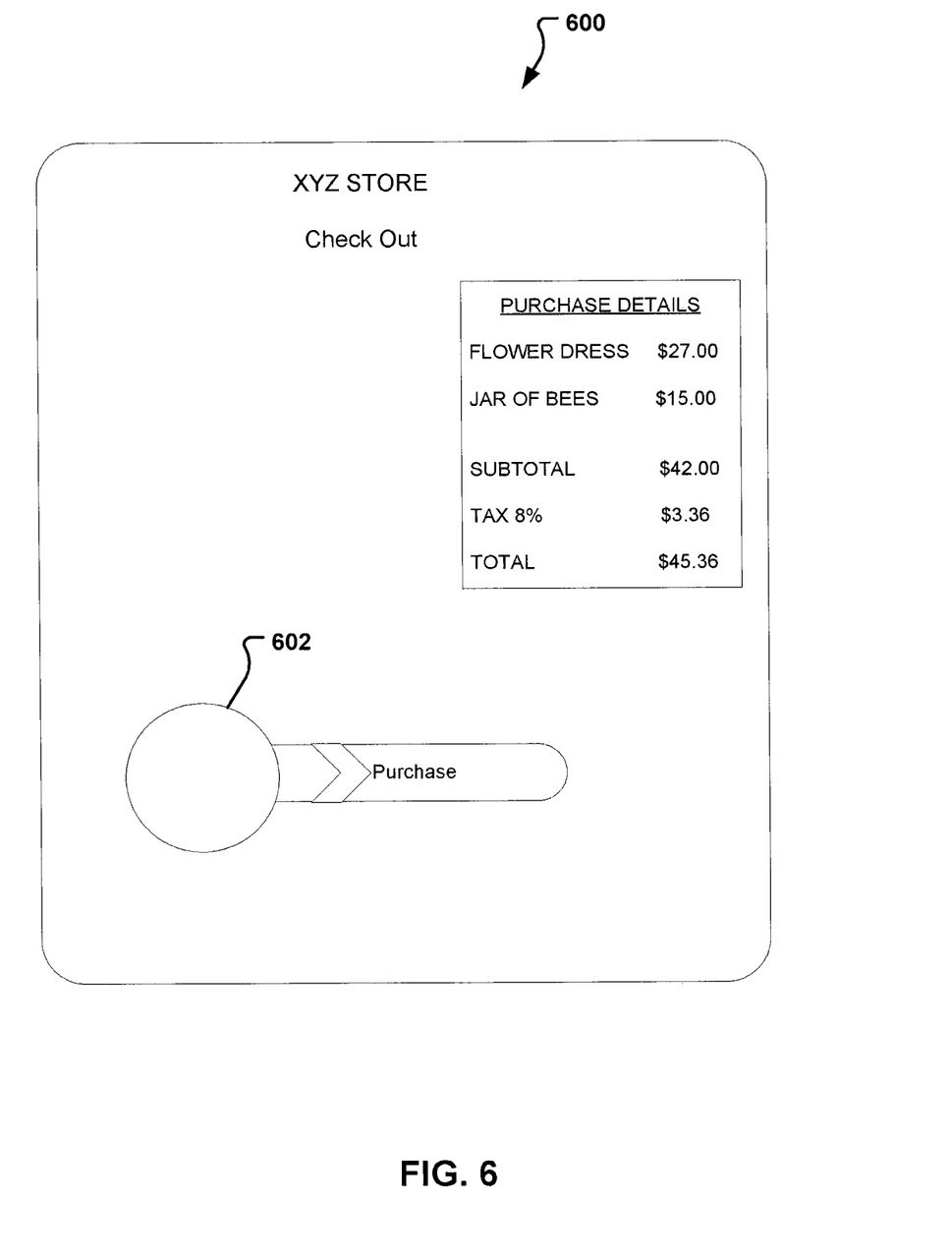
FIG. 6 is an illustration of haptic feedback associated with a user activity being provided based on detecting the user activity, in accordance with an embodiment.

FIG. 6 is an illustration of device 600 and further depicts a haptic feedback associated with a user activity being provided based on detecting the user activity, in accordance with an embodiment. In the example embodiment, navigation point 602 is an illustration of a finger of a user, a cursor, or a stylus being utilized to engage with a specific interface element that corresponds to a purchase authentication. Furthermore, in the example embodiment, the user activity of engaging with the interface element that corresponds to a purchase authentication is associated with a haptic feedback, which is then provided to the user.

Figure 7:
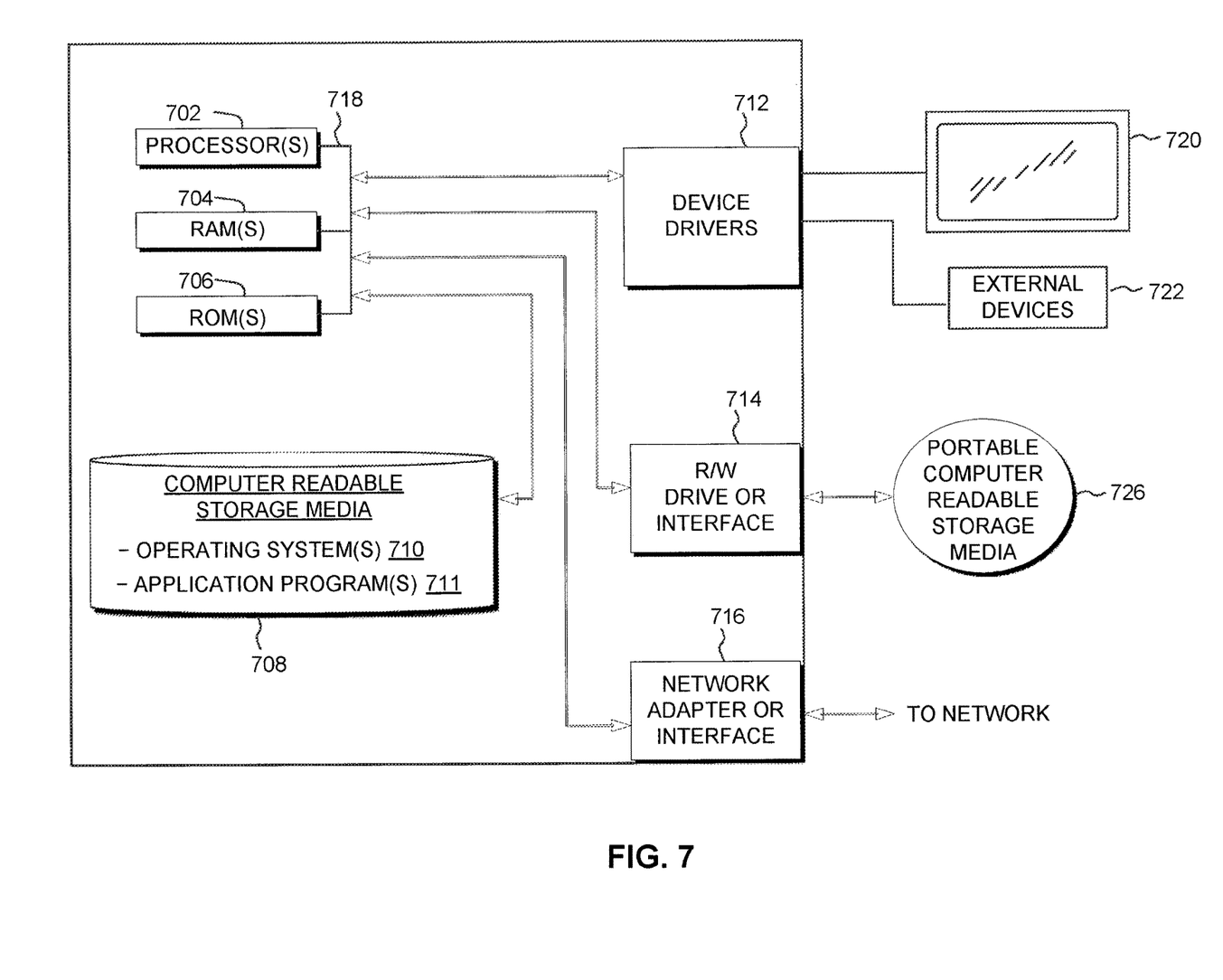
FIG. 7 is a block diagram depicting the hardware components of the haptic feedback system of FIG. 1, in accordance with an embodiment.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

FIG. 7 depicts a block diagram of components of computing devices contained in haptic feedback system 100 of FIG. 1 and haptic feedback system 400 in FIG. 4, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, touch program 112, are stored on one or more of the computer readable storage media 708 for execution by one or more of the processors 702 and by utilizing one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A mobile device comprising:
one or more computer-readable memories with program instructions stored thereon; and
one or more processors coupled to the one or more computer-readable memories and configured to execute the program instructions to cause the mobile device to perform operations comprising:
monitoring a first user activity on the mobile device, wherein the first user activity comprises a swipe interaction;
determining that the first user activity corresponds to one or more stored user activities and is within a threshold distance of a first interface element, wherein the first interface element is a swipeable interface element configured to authorize a purchase of one or more items through an application on the mobile device;
in response to the determining that the first user activity corresponds to the one or more stored user activities and is within the threshold distance of the first interface element, causing a first haptic feedback to be provided on a display screen of the mobile device, wherein the first haptic feedback comprises an electro-static frictional resistance that increases as the swipeable interface element is swiped toward an authorization to purchase the one or more items based on one or more predefined rules associated with financial information of a user of the mobile device;
monitoring a second user activity on the mobile device, wherein the second user activity comprises a touch input;
determining that the second user activity corresponds to the touch input being directed to a second interface element corresponding to a non-preferred payment option in a purchase of the one or more items; and
in response to the determining that the second user activity corresponds to the touch input being directed to the non-preferred payment option, causing a second haptic feedback, comprising the electro-static frictional resistance, to be provided on the display screen of the mobile device, wherein the second haptic feedback guides the touch input to a third interface element corresponding to a preferred payment option through the electro-static frictional resistance in directions that do not lead to the preferred payment option.

2. The mobile device of claim 1, wherein the operations further comprise determining that the purchase does not satisfy the one or more predefined rules by determining that an amount associated with the purchase exceeds a threshold amount.

3. The mobile device of claim 1, wherein the operations further comprise determining that the purchase does not satisfy the one or more predefined rules by determining that an amount associated with the purchase will result in insufficient funds in an account being used for the purchase.

4. The mobile device of claim 1, wherein the operations further comprise determining that the purchase does not satisfy the one or more predefined rules by determining that the preferred payment option has not been selected for the purchase of the one or more items.

5. The mobile device of claim 1, wherein the operations further comprise determining that the purchase does not satisfy the one or more predefined rules by determining that the purchase is being made during a certain time of a day.

6. The mobile device of claim 1, wherein the operations further comprise determining that the purchase does not satisfy the one or more predefined rules by determining that the purchase is being made from a certain merchant.

7. The mobile device of claim 1, wherein the operations further comprise determining that the purchase does not satisfy the one or more predefined rules by determining that the purchase includes a certain item.

8. A method comprising:
monitoring, by a mobile device, a first user activity on the mobile device;
determining, by the mobile device, that the first user activity corresponds to one or more stored user activities and is within a threshold distance of a first interface element, wherein the one or more stored user activities comprises a swipe interaction with the first interface element to authorize a purchase of one or more items through an application on the mobile device;
in response to the determining that the first user activity corresponds to the one or more stored user activities and is within the threshold distance of the first interface element, causing, by the mobile device, a first haptic feedback to be provided on a display screen of the mobile device, wherein the first haptic feedback comprises an electro-static frictional resistance that increases as the first interface element is swiped toward an authorization to purchase the one or more items based on one or more predefined rules associated with financial information of a user of the mobile device;
monitoring, by the mobile device, a second user activity on the mobile device, wherein the second user activity comprises a touch input;
determining that the second user activity corresponds to the touch input being directed to a second interface element corresponding to a non-preferred payment option in a purchase of the one or more items; and
in response to the determining that the second user activity corresponds to the touch input being directed to the non-preferred payment option, causing a second haptic feedback, comprising the electro-static frictional resistance, to be provided on the display screen of the mobile device, wherein the second haptic feedback guides the touch input to a third interface element corresponding to a preferred payment option through the electro-static frictional resistance in directions that do not lead to the preferred payment option.

9. The method of claim 8, further comprising determining that the purchase does not satisfy the one or more predefined rules by determining that an amount associated with the purchase exceeds a threshold amount.

10. The method of claim 8, further comprising determining that the purchase does not satisfy the one or more predefined rules by determining that an amount associated with the purchase will result in insufficient funds in an account being used for the purchase.

11. The method of claim 8, further comprising determining that the purchase does not satisfy the one or more predefined rules by determining that the purchase is being made during a certain time of a day.

12. The method of claim 8, further comprising determining that the purchase does not satisfy the one or more predefined rules by determining that the purchase is being made from a certain merchant.

13. The method of claim 8, further comprising determining that the purchase does not satisfy the one or more predefined rules by determining that the purchase includes a certain item.

14. A computer program product comprising:
one or more computer-readable tangible storage devices, and program instructions stored on at least one of the one or more computer-readable tangible storage devices, the program instructions when executed cause a machine to perform operations comprising:
monitoring a first user activity on a mobile device;
determining that the first user activity corresponds to one or more stored user activities and is within a threshold distance of a first interface element associated with an application and displayed on the mobile device, wherein the one or more stored user activities comprises a swipe interaction with the first interface element to authorize a purchase of one or more items through the application;
in response to the determining that the first user activity corresponds to the one or more stored user activities and is within the threshold distance of the first interface element, causing a first haptic feedback to be provided on a display screen of the mobile device, wherein the first haptic feedback comprises an electro-static frictional resistance that increases as the first interface element is swiped toward an authorization to purchase the one or more items based on predefined rules associated with financial information of a user of the mobile device;
monitoring a second user activity on the mobile device, wherein the second user activity comprises a touch input;
determining that the second user activity corresponds to the touch input being directed to a second interface element corresponding to a non-preferred payment option in a purchase of the one or more items; and
in response to the determining that the second user activity corresponds to the touch input being directed to the non-preferred payment option, causing a second haptic feedback, comprising the electro-static frictional resistance, to be provided on the display screen of the mobile device, wherein the second haptic feedback guides the touch input to a third interface element corresponding to a preferred payment option through the electro-static frictional resistance in directions that do not lead to the preferred payment option.

15. The computer program product of claim 14, wherein the operations further comprise determining that the purchase does not satisfy the one or more predefined rules by determining that an amount associated with the purchase exceeds a threshold amount.

16. The computer program product of claim 14, wherein the operations further comprise determining that the purchase does not satisfy the one or more predefined rules by determining that an amount associated with the purchase will result in insufficient funds in an account being used for the purchase.

17. The computer program product of claim 14, wherein the operations further comprise determining that the purchase does not satisfy the one or more predefined rules by determining that the purchase is being made during a certain time of a day.

18. The computer program product of claim 14, wherein the operations further comprise determining that the purchase does not satisfy the one or more predefined rules by determining that the purchase is being made from a certain merchant.

19. The computer program product of claim 14, wherein the operations further comprise determining that the purchase does not satisfy the one or more predefined rules by determining that the purchase includes a certain item.

\* \* \* \* \*